US008805449B2

(12) United States Patent
    Baard

(10) Patent No.: US 8,805,449 B2
(45) Date of Patent: Aug. 12, 2014

(54) COMMUNICATION TERMINALS AND METHODS WITH RAPID INPUT STRING MATCHING

(75) Inventor: Henrik Baard, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 2231 days.

(21) Appl. No.: 11/557,220

(22) Filed: Nov. 7, 2006

(65) Prior Publication Data

US 2008/0108341 A1    May 8, 2008

(51) Int. Cl.
    *H04M 1/00*  (2006.01)
    *G06F 17/30*  (2006.01)
    *H04M 1/2745*  (2006.01)
    *G06F 3/023*  (2006.01)
    *H04M 1/725*  (2006.01)

(52) U.S. Cl.
    CPC ... *H04M 1/274558* (2013.01); *G06F 17/30887* (2013.01); *G06F 3/0237* (2013.01); *H04M 1/72561* (2013.01)
    USPC .......................................... 455/566; 455/564

(58) Field of Classification Search
    USPC ................................................. 455/564, 566
    See application file for complete search history.

(56) References Cited

U.S. PATENT DOCUMENTS

| 7,085,369 | B2 | 8/2006 | Wang |
| 2002/0116528 | A1 | 8/2002 | Vale |
| 2002/0198027 | A1* | 12/2002 | Rydbeck ..................... 455/564 |
| 2004/0204202 | A1* | 10/2004 | Shimamura et al. ........ 455/575.1 |
| 2005/0227739 | A1* | 10/2005 | Dowling et al. ............. 455/566 |

FOREIGN PATENT DOCUMENTS

| EP | 1 780 642 A1 | 5/2007 |
| WO | WO 01/54380 A2 | 7/2001 |
| WO | WO 01/54380 A3 | 7/2001 |
| WO | WO 2006/008926 A1 | 1/2006 |

OTHER PUBLICATIONS

International Search Report and Written Opinion for PCT/EP2007/054360; Jul. 31, 2007.
European Communication Corresponding to European Patent Application No. 07 728 813.2; Dated: Feb. 12, 2013; 4 Pages.

* cited by examiner

*Primary Examiner* — Manpreet Matharu
(74) *Attorney, Agent, or Firm* — Myers Bigel Sibley & Sajovec, PA

(57) ABSTRACT

A portable electronic device includes a display, a user input device, and a controller that is coupled to the display and the user input device, and that is configured to execute an application program. The device further includes a user input management unit that is configured to receive an input string of characters from the user input device, configured to retrieve a bookmark list containing content identifiers that have been pre-stored by a user, configured to compare the input string to the content identifiers in the bookmark list, and configured to display a selection list on the display including a subset of the content identifiers in the bookmark list that match the input string.

24 Claims, 5 Drawing Sheets

COMMUNICATION TERMINALS AND METHODS WITH RAPID INPUT STRING MATCHING

FIELD OF THE INVENTION

The present invention relates to electronic devices and, more particularly, to electronic devices, methods and computer program products having internet browser capability.

BACKGROUND

Portable electronic devices, such as wireless communication terminals (e.g., cellular telephones), personal digital assistants (PDAs), palmtop computers, and the like, have the ability to access a wide range of information content, including information content stored locally and/or information content accessible over a network such as the Internet. Furthermore, many portable electronic devices include color display screens that may be used to display webpages, images and videos, among other things. Portable electronic devices may also include Internet browser software that is configured to access and display Internet content.

In many Internet browser applications, including browser applications configured for use on portable electronic devices, it is common to permit the user to store a list of favorite, or bookmarked, webpages. When a user desires to access a bookmarked webpage, the bookmark list may be opened, and the user may scroll through the bookmark list and select a desired bookmark from the list. When a bookmark is selected, the associated webpage is accessed by the browser and displayed on the display screen.

In addition to accessing internet content, portable electronic devices are widely used to store and play back digital audio files, video files, image files, and/or other types of multimedia files. Multimedia files may include any other type of file containing audio, visual or textual information. For example, as used herein, a "multimedia" file may include MMS or PPT message files in addition to or in place of typical multimedia files, such as audio, image and/or video files.

SUMMARY

Some embodiments of the invention provide a electronic device including a display, a user input device, and a controller that is coupled to the display and the user input device, and that is configured to execute an application program. The device further includes a user input management unit that is configured to receive an input string of characters from the user input device, configured to retrieve a bookmark list containing content identifiers that have been pre-stored by a user, configured to compare the input string to the content identifiers in the bookmark list, and configured to display a selection list on the display including a subset of the content identifiers in the bookmark list that match the input string.

The user input management unit may be further configured to determine that a content identifier in the bookmark list matches the input string if the content identifier includes the input string anywhere in the content identifier.

The user input management unit may be further configured to generate, in response to the input string not being in any of the content identifiers in the bookmark list, a metric indicative of how closely the input string matches each content identifier in the bookmark list and to display the content identifiers that most closely match the input string in the selection list. The user input management unit may be further configured to display in the selection list only those content identifiers for which the metric exceeds a threshold level.

The user input management unit may be further configured to display an icon in the selection list adjacent each content identifier of the subset of content identifiers that identifies the corresponding content identifier as an item in the bookmark list.

The user input management unit may be further configured to retrieve a history list of content identifiers that have been automatically stored by the application program or by the user input management unit, configured to compare the input string to the content identifiers in the history list, configured to identify a subset of the content identifiers in the history list that match the input string, and configured to display the subset of content identifiers in the history list that match the input string in the selection list. The user input management unit may be further configured to display an icon in the selection list adjacent each content identifier of the subset of content identifiers in the history list that identifies the corresponding content identifier as an item in the history list.

The input device may include an alphanumeric keypad having a plurality of keys in which at least some of the keys of the keypad are used to input both letters and numbers.

The controller may be configured to execute a plurality of application programs, and the user input management unit may include a module configured to run separately from the application programs. The user input management unit may be configured to determine, in response to the input string being received, which of the plurality of application programs is currently active and to retrieve a bookmark list associated with the active application program.

The user input management unit may be configured to retrieve a master bookmark list that includes entries that are associated with a plurality of content types. The user input management unit may be further configured to determine a content type associated with the selected content identifier, configured to determine if an application program associated with the content type is active, and configured, in response to the application program associated with the selected content type being active, to provide the content identifier to the application program associated with the content type. The user input module may be further configured, in response to determining that the application program associated with the content type is not active, to invoke the application program associated with the content type and to provide the selected content identifier to the invoked application program.

Corresponding methods of operating a portable electronic device and computer program products are also provided.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
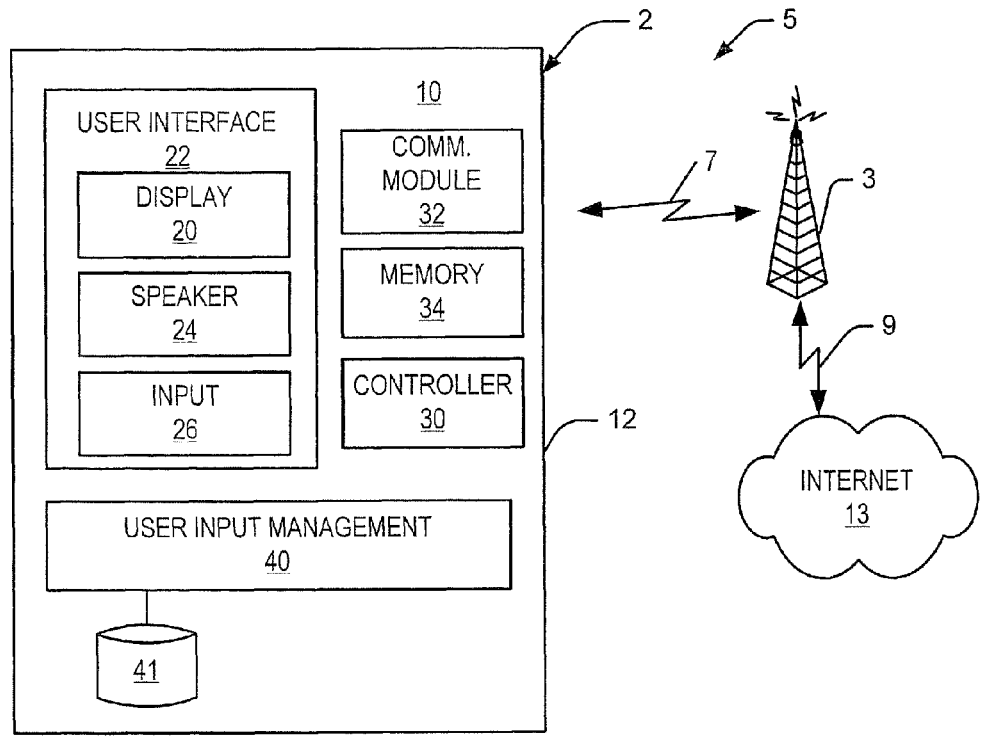
FIG. 1 is a schematic diagram of an electronic device, such as a portable electronic device, according to some embodiments of the present invention and an exemplary base transceiver station.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

The present invention may be embodied as methods, electronic devices, and/or computer program products. Accordingly, the present invention may be embodied in hardware (e.g. a controller circuit or instruction execution system) and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can electronically/magnetically/optically retain the program for use by or in connection with the instruction execution system, apparatus, controller or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

As used herein "play," "playback," and/or "execution" of a multimedia file is used in a general sense and may include playing an audio file over a speaker, displaying a digital image on a display screen, displaying a video file on a display screen and simultaneously playing an audio file associated with and/or embedded in the video file over a speaker, and/or displaying a web page and executing scripts associated with and/or embedded in the web page.

Some embodiments of the present invention will now be described below with respect to FIGS. 1-5. Some embodiments of the present invention provide methods and apparatus that may permit a user to rapidly locate and access stored or remote content by performing string matching on characters input by the user against both automatically stored identifiers (such as URLs or filenames automatically stored in a history list) and user-stored content identifiers, such as stored bookmarks. Some embodiments of the invention may be particularly useful in connection with a portable electronic device which may have more limited user input capability than a conventional desktop/laptop computer. Conventional browsers may only compare input strings entered by a user to URLs stored in a history list, and may not provide rapid text-based access to bookmarked targets as is provided according to some embodiments of the invention.

Referring to FIG. 1, an exemplary portable electronic device 10 in accordance with some embodiments of the present invention is illustrated. It will be appreciated that although embodiments of the invention are illustrated in connection with a wireless communication terminal, the invention may include wired mobile and/or non-mobile communication terminals and other electronic devices and methods. The portable electronic device 10 is configured to communicate data with one or more other wireless terminals over a direct wireless communication interface therebetween, over another wireless communication interface through one or more cellular base stations, and/or over another wireless communication interface through a wireless local area network (WLAN) router.

The portable electronic device 10 may be a mobile radiotelephone forming a part of a radiotelephone communication system 2 as illustrated in FIG. 1. The system 2 includes the portable electronic device 10 and a base transceiver station 3, which is part of a wireless communications network 5. In some embodiments of the present invention, the base transceiver station 3 includes the radio transceiver(s) that define an individual cell in a cellular network and communicates with the portable electronic device 10 (via an interface 7) and other mobile terminals in the cell using a radio-link protocol. It will be understood that, in some embodiments of the present invention, many base transceiver stations may be connected through, for example, a mobile switching center and other devices to define the wireless communications network. The base station transceiver 5 may be connected to a data communications network 13, such as the Internet, via a communication link 9. It will be appreciated that the communication link 9 may include elements of the wireless communications network and/or one or more gateways, routers, or other communication nodes.

The portable electronic device 10 in the illustrated embodiments includes a portable housing assembly 12, a controller circuit 30 ("controller"), a communication module 32, and a memory 34. The portable electronic device 10 further includes a user interface 22 (i.e., a man machine interface) including a display 20, a speaker 24 (i.e., a sound transducer), and at least one input device 26. The input device 26 may include a keyboard, which may be a numerical keyboard including keys that correspond to a digit as well as to one or more characters, such as may be found in a conventional wireless telephone. In some embodiments, the input device 26 may include a full QWERTY keyboard that may be operated, for example, using thumbs. More than one input device 26 may be included.

According to some embodiments of the invention, the electronic device 10 further includes a user input management unit 40. The user input management unit 40 may be configured to receive and process inputs received through the input device 26 of the user interface 22. In processing the user input, the user input management unit 40 may refer to information stored in a database 41 (e.g. a table, file, or other associative repository). The information stored in the database 41 may include one or more lists of content identifiers associated with one or more content types and/or one or more application programs. For example, the database 41 may include a list of URL's (uniform resource locators) of favorite web pages that have been pre-stored by a user. A list of content identifiers that has been stored by the user is referred to herein as a "bookmark" list or a "favorites" list. The database 41 may further include a list of content identifiers associated with content that a user has recently accessed, such as a history list or a list of recently used files. In some embodiments, the database 41 may include separate bookmark and history lists for each application and/or for each type of content. For example, the database 41 may include separate bookmark/history lists for web pages, audio files, image files, etc., and/or the database may include separate bookmark/history lists for each application program installed on the portable electronic device 10. For example, there may be a separate bookmark list for an internet browser, a separate bookmark list for an image viewer, etc. In some embodiments, the database 41 may include a master bookmark list and/or a master history list that include content identifiers for different kinds of content that may be accessed using different application programs.

As used herein, the term "content identifier" may include a URL, a file name, an address, an alias, or any other identifier that uniquely identifies an item of content, such as a web page, an audio file, an image file, a document, or the like. It will be appreciated that the database 41 may be stored in a memory such as the memory 34, which may be a volatile or non-volatile memory, and/or in a magnetic storage device, such as a disk drive that is accessible by the user input management unit 40.

The display 20 may be any suitable display screen assembly. For example, the display screen 20 may be a liquid crystal display (LCD) with or without auxiliary lighting (e.g., a lighting panel). In some cases the portable electronic device 10 may be capable of playing video content of a particular quality. For example, a portable electronic device 10 may be configured to display a video stream having a particular aspect ratio, such as 16:9 or 4:3. A number of standard video formats have been proposed for mobile terminals, including Quarter VGA (QVGA, 320×240 pixels), Common Intermediate Format (CIF, 360×288 pixels) and Quarter Common Intermediate Format (QCIF, 180×144 pixels). Moreover, some mobile terminals may have multiple display screens having different display capabilities. Thus, a portable electronic device 10 may be capable of displaying video in one or more different display formats.

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 24 generates sound responsive to an input audio signal. The user interface 22 can also include a microphone coupled to an audio processor that is configured to generate an audio data stream responsive to sound incident on the microphone.

The controller 30 may support various functions of the portable electronic device 10. The controller 30 can be any commercially available or custom microprocessor, for example. In use, the controller 30 of the portable electronic device 10 may generate a display image on the display 20. In some embodiments, however, a separate signal processor and/or video chip (not shown) may be provided in the portable electronic device 10 and may be configured to generate a display image on the display 20.

The memory 34 is configured to store digital information signals and data such as a digital multimedia files (e.g., digital audio, image and/or video files).

The communication module 32 is configured to communicate data over one or more wireless interfaces to another remote wireless terminal as discussed herein. The communication module 32 can include a cellular communication module, a direct point-to-point connection module, and/or a WLAN module.

With a cellular communication module, the portable electronic device 10 can communicate via the base transceiver station(s) 3 of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the portable electronic device 10 can communicate via an ad-hoc network through a direct point-to-point interface.

With a WLAN module, the wireless terminal 10 can communicate through a WLAN using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 5, a router or directly to another terminal) and receive incoming radio frequency signals (e.g., from the network 5, a router or directly to another terminal), such as voice and data signals, via an antenna. The communication module 32 may include a short range transmitter and receiver, such as a Bluetooth transmitter and receiver. The antenna may be an embedded antenna, a retractable antenna or any antenna known to those having skill in the art without departing from the scope of the present invention. The radio frequency signals transmitted between the portable electronic device 10 and the network 5, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The portable electronic device 10 may also be configured to electrically couple with another terminal via a wireline or cable for the transmission of digital communication signals therebetween. The portable electronic device 10 may include further components such as a camera device configured to generate a still image and/or video data stream based on incident light.

Although FIG. 1 illustrates an exemplary hardware/software architecture that may be used in mobile terminals and/or other electronic devices for management and playback of multimedia files, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

Figure 2A:
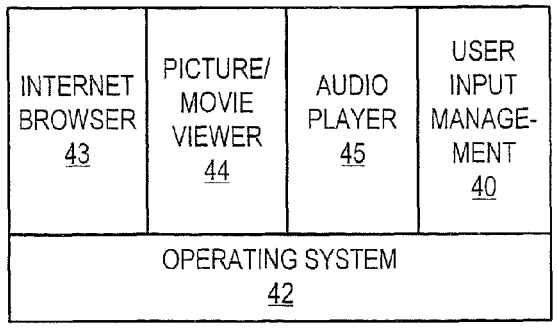
FIGS. 2A and 2B illustrate possible relationships between a user input management unit, an operating system and application programs in an electronic device configured according to some embodiments of the invention.

As shown in FIG. 2A, the user input management unit 40 may be implemented as a software module that runs on an operating system 42 of the portable electronic device 10 separately from application software such as an Internet browser 43, a picture/movie viewer 44, and/or an audio player 45. Thus, in some embodiments, the user input management unit 40 may process user input from the input device 26 for more than one application program running in the portable electronic device 10. The user input management unit 40 may be configured to determine which application program is active when user input is received, and to associate the user input with an appropriate list of stored content identifiers, such as items in a bookmark list and/or items in a history list, depending on which application program is currently active.

Figure 2B:
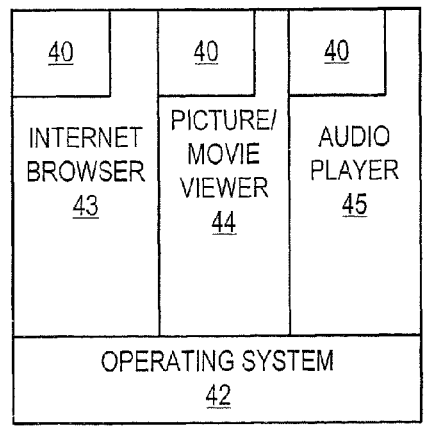

In other embodiments, as shown in FIG. 2B, each application program may be configured to invoke a separate instance of the user input management unit 40, which then processes user input exclusively for the invoking application. When an application program, such as the Internet browser 43, invokes the user input management unit 40, the application program may provide the user input management unit 40 with operating parameters, such as a pointer to a bookmark list (i.e. a list of content identifiers that have been stored by the user) and/or a history list or other list of automatically stored content identifiers such as a recently used files list associated with an application program.

The user input management unit 40 may refer to the content identifiers in the manner described below in order to permit the user to rapidly select an item of content for display/execution by the application program.

Figure 3A:
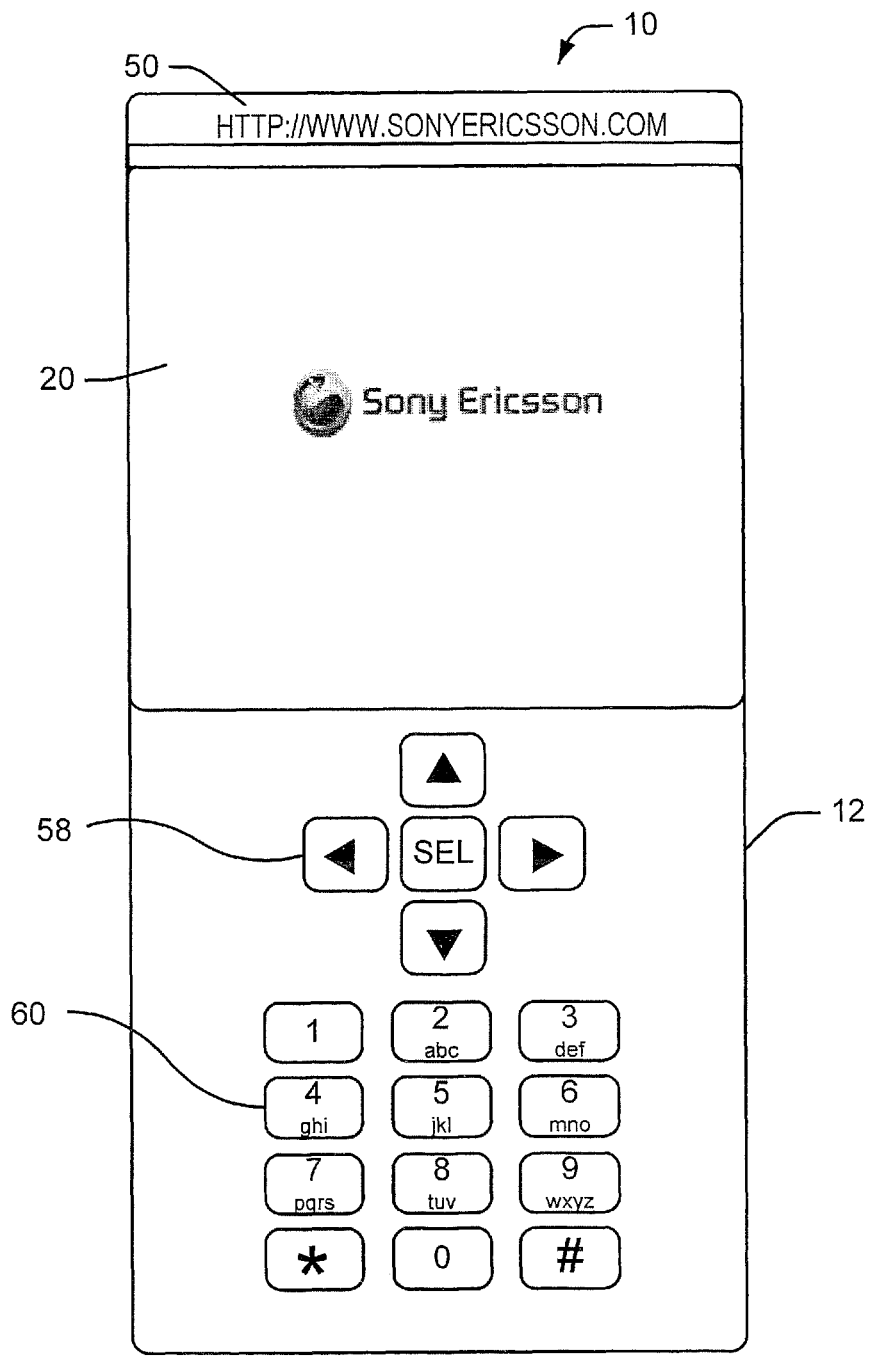
FIGS. 3A and 3B illustrate a portable electronic device according to some embodiments of the present invention in further detail.
Figure 3B:
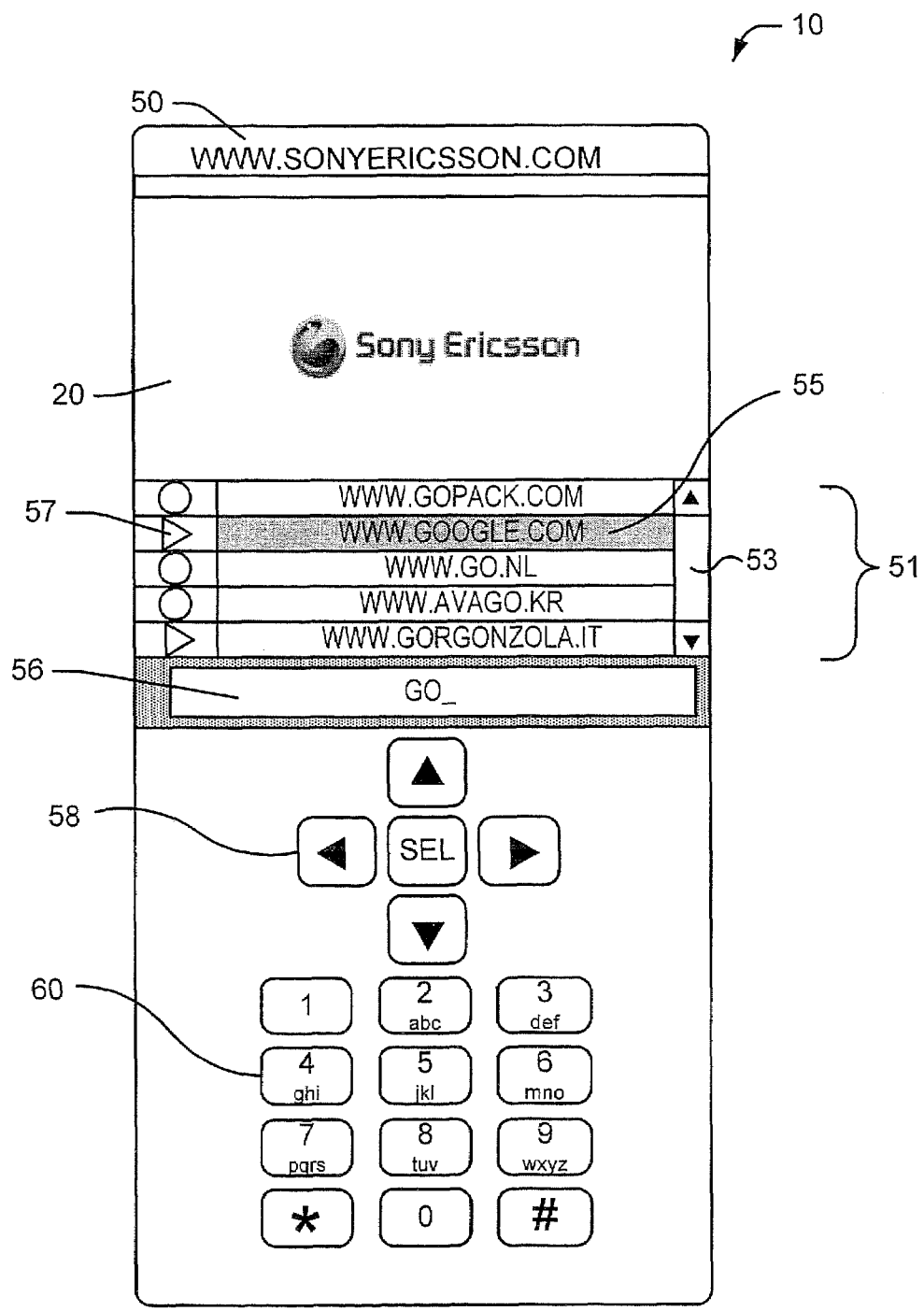

Referring to FIGS. 3A and 3B, a portable electronic device 10 is shown in more detail. The portable electronic device 10 includes a housing 12 on which a display 20 is provided. Also provided on the housing 12 are an alphanumeric keypad 60 and a set of selection keys 58 including up (▲), down (▼), and select (SEL) keys. The alphanumeric keypad 60 may include a standard 10 digit numeric keypad in which the keys 2-9 are also used for alpha input. (For example, when the key '2' is pressed repeatedly, the input may cycle sequentially through 2, a, b, and c). However, it will be appreciated that the alphanumeric keypad 60 could include a full QWERTY keyboard, a touchpad with character recognition, or other input device. As shown in FIG. 3A, the portable electronic device 10 may include an Internet browser that is capable of displaying HTML-formatted webpages. When a webpage is displayed on the display, and address bar 50 on the display 20 may display the address of the webpage that is currently being displayed (e.g. http://www.sonyericsson.com).

Referring to FIG. 3B, when a user desires to access an item of content, such as a web page, the user may begin to input alphanumeric symbols using the alphanumeric keypad 60, for example by pressing any of the digits 2-9 on the alphanumeric keypad 60. When the user initially depresses an alphanumeric key, the user input management unit 40 may automatically display a user input box 56 and begin to display the characters input by the user in the user input box 56. As each alphanumeric character is input into the user input box 56, the user input management unit 40 may compare the input character string, or candidate character strings when each key has a plurality of assigned meanings (e.g. 4, g, h, i) against the content identifiers stored in a bookmark list and/or a history list. The bookmark and history lists may be master lists maintained by the user input management unit and/or may be lists maintained by the active application program.

Once the number of matching content identifiers in the bookmark list and/or in the history list is less than a predefined number, which may be set as a user preference, the user input management unit 40 may display a selection list 51 including a plurality of matching content identifiers. Each displayed content identifier in the selection list 51 may include an associated icon 57 that may indicate the origin of the matching content identifiers. For example content identifiers that were found in a bookmark list may be identified by a first icon 57 (e.g. a triangle), while content identifiers that were identified from a history list may have may be identified by a second icon 57 (e.g. a circle). Thus, when the selection list 51 is displayed to the user, the user may be able to quickly tell that a displayed content identifier is from the user's bookmark (favorites) list.

Using selection keys 58, such as the up/down arrow keys and the select (SEL) key, the user may select one of the displayed content identifiers, or the user may continue to input characters using the keypad 60. An optional slider bar 53 may be provided adjacent the selection list 51 to indicated that there are more matching content identifiers than are currently being displayed on the screen 20. The hidden matching content identifiers may be displayed/selected using the up/down keys. If the user continues to input characters, the user input management unit 40 continues to compare the characters input by the user to the stored content identifiers, and may narrow down the list of displayed content identifiers. If the user selects one of the content identifiers shown in the selection list 51, the user input management unit 40 passes the selected content identifier to the executing application program. The executing application program then retrieves the content identified by the content identifier and displays/executes the content.

As seen in FIG. 3B, in some embodiments, the user input management unit 40 may be configured to select content identifiers that contain the text characters entered by the user anywhere in the content identifier. For example, in the embodiments shown in FIG. 3B, the user has entered the letters "GO". The user input management unit 40 compares the input character string "GO" to the content identifiers stored in the bookmark list and the history list and, in the illustrated embodiments, has found five content identifiers that include the string "GO." The matching content identifiers are presented to the user in the selection list 51.

Other methods may be used by the user input management unit 40 to determine that an input string matches a content identifier stored in the bookmark list. For example, if the user input management unit 40 finds no exact matches for the input string, the user input management unit 40 may display the closest matches to the input string. This feature may be particularly helpful when the input string is being input on a portable device using an alphanumeric keyboard, as it may be easy for a user to misspell a word or otherwise make a mistake when entering the input string. For example, if a user were to enter "SONZ" as an input string, the user input management unit 40 may determine that www.sonyericsson.com and www.sony.com are the closest matches found in the bookmark list, and display those choices in the selection list 51.

In some embodiments, if the input string is not found in any of the content identifiers in the bookmark list and/or the history list, the user input management unit 40 may generate a correlation metric for each entry in the bookmark list indicative of how closely the input string matches the entry. The user input management unit 40 may then display only those entries for which the correlation metric exceeds a threshold level. For example, for each content identifier in the bookmark list, the correlation metric may determine a percent match between the input string and the content identifier. The user input management unit 40 may only display those content identifiers in the selection list 51 for which the correlation metric exceeds a predetermined amount, e.g. 50%. Alternatively or additionally, the user input management unit 40 may display a defined number and/or prioritized list of the closest matching content identifiers.

In some embodiments in which the keys on the alphanumeric keypad 60 correspond to multiple characters (e.g. 4, g, h, i), the user input management unit 40 may generate multiple hypothetical input strings for each set of keys pressed by the user containing all combinations of letters and numbers that could be represented by the pressed keys. The user input management unit 40 may compare the hypothetical input strings against the content identifiers in the bookmark list to determine if there is a match. For example, if the user pressed the keys "5" and "6" on the alphanumeric keypad 60 shown in FIG. 3A, the possible combinations would include "JM", "JN", "JO", "J6", "KM", "KN", "KO", "K6", "LM", "LN", "LO", "L6", "5M", "5N", "5O", and "56." Each of these hypothetical input strings may be compared to the content identifiers to determine if there is a match, or a likely match. As each additional key is pressed by the user, the number of possible combinations increases, but the number of likely matches may decrease. In this manner, the user may be able to more quickly spell out the name of the intended content identifier and access the desired bookmark.

In some embodiments, in order to facilitate processing, the user input management unit 40 may translate the content identifiers into strings of digits representing the keys associated with the characters in the content identifier and store the translated content identifiers, for example, in the database 41. For example, sony.com may be translated to 7669266, where key 7 corresponds to p, q, r and s, key 6 corresponds to m, n and o, etc. Thus, when the name of the content identifier is spelled out on the keyboard, the user input management unit may more quickly locate matching bookmarks and display the matching bookmarks to the user. Translating the content identifiers into a numeric string may also facilitate generation of a correlation metric, as described above, since the user input management unit 40 may easily perform a mathematical correlation between a numerical input string and the translated content identifiers.

In some embodiments, predictive string matching may be used to prioritize the bookmarks in the selection list 51. For example, the user input management unit 40 may monitor the frequency with which particular bookmarks are selected by the user and may present the most frequently selected matching bookmark first in the selection list 51, followed by the next most frequently selected matching bookmark, etc.

Items in the selection list 51 may be highlighted and selected using the selection keys 58 (or a jog dial, touchpad or other pointing device). As seen in FIG. 3B, a particular content identifier 55 has been highlighted. When the highlighted content identifier 55 is selected, for example by pressing the selection (SEL) key, the selected content identifier will be provided to the executing application program (in this case, the browser software 43), which can then access the webpage identified by the selected content identifier.

The user input management unit 40 may be used to select input for other types of application programs, such as image viewers, audio players, video players, and the like. As discussed above, the user input management unit 40 may be implemented within the application programs or may operate independently of the application programs.

For example, when the user input management unit 40 is invoked by an image viewer application program 44 (FIG. 2A), the application program 44 may pass a list (or a pointer to a list) of favorites and or a list (or a pointer to a list) of previously viewed images (i.e. a history list) to the user input management unit 40. When the user begins to enter alphanumeric text, the user input management unit 40 may compare the characters entered by the user to file names contained in the bookmark list in the history list and may display a selection list containing filenames that match the entered text. When the user selects an item from the selection list, that identifier is passed to the image viewer application, which retrieves and displays the selected image.

Figure 4:
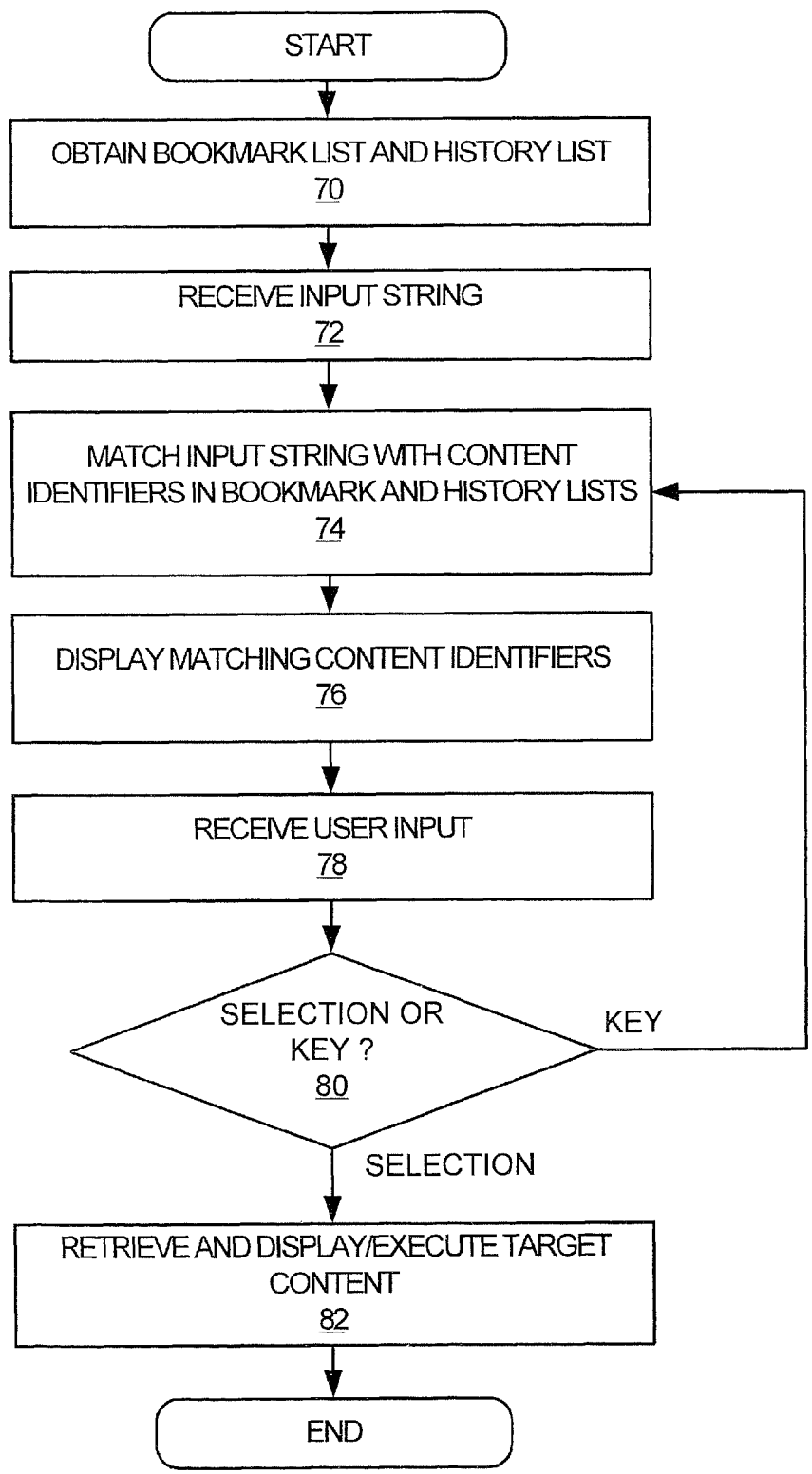
FIG. 4 is a flowchart illustrating operations in accordance with some embodiments of the present invention.

FIG. 4 illustrates operations for rapidly identifying a content identifier according to some embodiments of the invention. Referring to FIGS. 1-4, the operations begin at block 70 in which the user input management unit 40 obtains a list of bookmarks, which represents a list of content identifiers that have been stored by the user. The list of bookmarks may be obtained from an executing application program and/or may be independently maintained by the user input management unit 40. The user input management unit 40 may also obtain a list of other stored content identifiers, such as content identifiers stored in a history list by the application program that invoked the user input management unit 40, or by an application program that is identified as currently running by the user input management unit 40.

The user input management unit 40 then receives an input string from the input device 26 (block 72) and attempts to match the input string with items listed in the bookmark list and/or the history list (block 74). The user input management unit 40 then displays a selection list 51 that includes matching content identifiers selected from the bookmark list and/or the history list (block 76). In some embodiments, a selection list 51 may not be displayed until the number of matching entries is less than a predetermined number, to avoid displaying an excessively large selection list. For example, the selection list 51 may not be displayed until the number of matching entries is less than 10. An icon may be displayed alongside each of the content identifiers listed in the selection list 51 in order to identify the content identifier as a bookmark entry (favorite) or as an item from the history list.

A further user input is received (block 78) and the user input management unit 40 determines if the user input is a selection of a content identifier displayed in the selection list 51 or another alphanumeric key (block 80). If the user input is another alphanumeric key, the operations return to block 74 and the new input character is concatenated to the existing input string to form a new input string. The new input string is matched with the stored content identifiers, and the list of matching entries in the selection list 51 is narrowed. If the user input is a selection, the content identified by the user selection is retrieved and displayed/executed (block 82).

Figure 5:
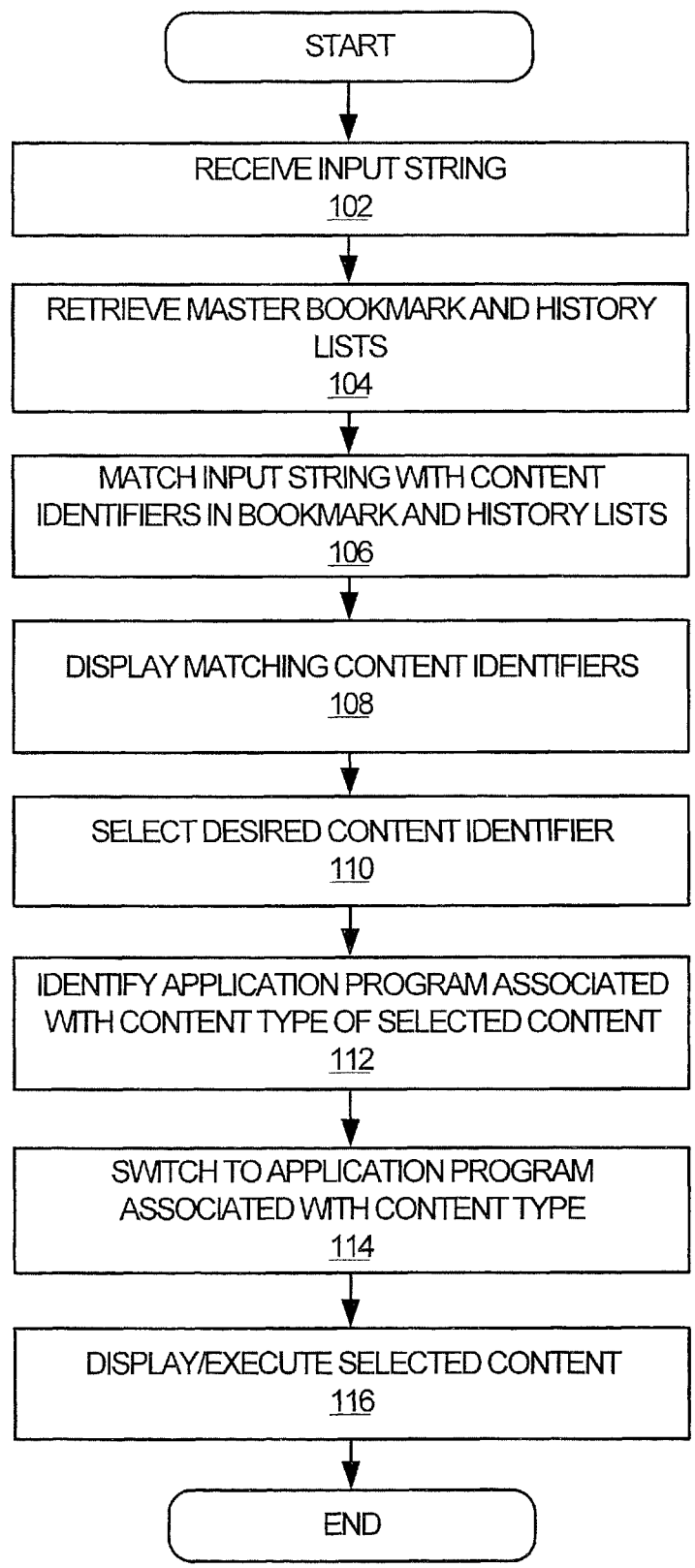
FIG. 5 is a flowchart illustrating further operations in accordance with some embodiments of the present invention.

Further operations of the invention are illustrated in the flowchart of FIG. 5. As noted above, in some embodiments of the invention, the user input management unit 40 may operate independently of the application programs installed in the portable electronic device 10. Accordingly, the user input management unit 40 may maintain a master bookmark list that may contain references to many different types of content, such as web pages, image files, sound files, etc., in the database 41. In addition, the user input management unit 40 may maintain a master history list, or list of recently used files, in the database 41 that contains references to many different types of content. Thus, referring to FIG. 5, when user input is received by the user input management unit 40 (block 102), the user input management unit 40 may retrieve the master bookmark list and/or the master history list from the database 41 (block 104).

The user input management unit 40 then matches the input string with content identifiers in the master bookmark list and/or the master history list. (Block 106). The user input management unit 40 then displays the matching content identifiers in a selection list 51 (block 108), and waits for the user to select a desired content identifier from the selection list 51 (block 110).

Once the user has selected a desired content identifier from the selection list 51, the user input management unit 40 determines which application program is associated with the content type of the selected content identifier (block 112). The user input management unit 40 may then determine if the associated application program is currently running, and if so, the user input management unit 40 provides the selected content identifier to the application program. (Block 114). The application program then displays/executes the selected content (block 116). If the application program is not currently running, the user input management unit 40 may send a request to the operating system to activate the appropriate application program. The selected content identifier may be provided as a parameter to the application program upon start-up so that the application program can immediately display/execute the content associated with the selected content identifier.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. An electronic device comprising:
   a display;
   a user input device;
   a controller that is coupled to the display and the user input device, and that is configured to execute an application program; and
   a user input management unit that is configured to receive an input string of characters from the user input device, configured to retrieve a bookmark list containing content identifiers that have been pre-stored by a user, configured to compare the input string to the content identifiers in the bookmark list, and configured to display a selection list on the display including a subset of the content identifiers in the bookmark list that match the input string;
   wherein the user input management unit is further configured to generate, in response to the input string not being in any of the content identifiers in the bookmark list, a correlation metric indicative of how closely the input string matches each content identifier in the bookmark list and to display the content identifiers that most closely match the input string in the selection list.

2. The electronic device of claim 1, wherein:
   the user input management unit is further configured to determine that a content identifier in the bookmark list matches the input string if the content identifier includes the input string anywhere in the content identifier.

3. The electronic device of claim 1, wherein:
   the user input management unit is further configured to display in the selection list only those content identifiers for which the correlation metric exceeds a threshold level.

4. The electronic device of claim 1, wherein:
   the user input management unit is further configured to display an icon in the selection list adjacent each content identifier of the subset of content identifiers that identifies the corresponding content identifier as an item in the bookmark list.

5. The electronic device of claim 1, wherein:
   the user input management unit is further configured to retrieve a history list of content identifiers that have been automatically stored by the application program or by the user input management unit, configured to compare the input string to the content identifiers in the history list, configured to identify a subset of the content identifiers in the history list that match the input string, and configured to display the subset of content identifiers in the history list that match the input string in the selection list.

6. The electronic device of claim 5, wherein:
   the user input management unit is further configured to display an icon in the selection list adjacent each content identifier of the subset of content identifiers in the history list that identifies the corresponding content identifier as an item in the history list.

7. The electronic device of claim 1, wherein the input device comprises an alphanumeric keypad having a plurality of keys in which at least some of the keys of the keypad are used to input both letters and numbers.

8. The electronic device of claim 1, wherein the controller is configured to execute a plurality of application programs; wherein the user input management unit comprises a module configured to run separately from the application programs, and wherein the user input management unit is configured to determine, in response to the input string being received, which of the plurality of application programs is currently active.

9. The electronic device of claim 8, wherein the user input management unit is configured to retrieve a bookmark list associated with the active application program.

10. The electronic device of claim 1, wherein the controller is configured to execute a plurality of application programs; and wherein the user input management unit is configured to retrieve a master bookmark list that includes entries that are associated with a plurality of content types.

11. The electronic device of claim 10, wherein the user input management unit is configured to determine a content type associated with the selected content identifier, configured to determine if an application program associated with the content type is active, and configured, in response to the application program associated with the selected content type being active, to provide the content identifier to the application program associated with the content type.

12. The electronic device of claim 11, wherein the user input module is further configured, in response to determining that the application program associated with the content type is not active, to invoke the application program associated with the content type and to provide the selected content identifier to the invoked application program.

13. A method of operating an electronic device including a user input device and a display, the method comprising:
   receiving an input string of characters from the user input device;
   retrieving a bookmark list containing content identifiers that have been pre-stored by a user of the portable electronic device;
   comparing the input string to the content identifiers in the bookmark list;
   displaying a selection list on the display including a subset of the content identifiers in the bookmark list that match the input string;
   generating, in response to the input string not being in any of the content identifiers in the bookmark list, a correlation metric indicative of how closely the input string matches each content identifier in the bookmark list; and
   displaying the content identifiers that most closely match the input string in the selection list.

14. The method of claim 13, further comprising:
   determining that a content identifier in the bookmark list matches the input string if the content identifier includes the input string anywhere in the content identifier.

15. The method of claim 13, further comprising:
   displaying in the selection list only those content identifiers for which the correlation metric exceeds a threshold level.

16. The method of claim 13, further comprising:
   displaying an icon in the selection list adjacent each content identifier of the subset of content identifiers that identifies the corresponding content identifier as an item in the bookmark list.

17. The method of claim 13, further comprising:
   retrieving a history list of content identifiers that have been automatically stored by the application program or by the user input management unit;
   comparing the input string to the content identifiers in the history list;
   identifying a subset of the content identifiers in the history list that match the input string; and
   displaying the subset of content identifiers in the history list that match the input string in the selection list.

18. The method of claim 17, further comprising:
displaying an icon in the selection list adjacent each content identifier of the subset of content identifiers in the history list that identifies the corresponding content identifier as an item in the history list.

19. The method of claim 13, further comprising:
executing a plurality of application programs; and
determining, in response to the input string being received, which of the plurality of application programs is currently active.

20. The method of claim 19, wherein retrieving the bookmark list comprises retrieving a bookmark list associated with the active application program.

21. The method of claim 13, further comprising:
executing a plurality of application programs; and
retrieving a master bookmark list that includes entries that are associated with a plurality of content types.

22. The method of claim 21, further comprising:
determining the content type associated with the selected content identifier,
determining if an application program associated with the content type is active, and
in response to the application program associated with the selected content type being active, providing the content identifier to the application program associated with the content type.

23. The method of claim 22, further comprising:
in response to determining that the application program associated with the content type is not active, invoking the application program associated with the content type; and
providing the selected content identifier to the invoked application program.

24. A computer program product for operating a portable electronic device including a user input device and a display, the computer program product comprising:
a non-transitory computer readable storage medium having computer readable program code embodied in said medium, said computer readable program code comprising:
computer readable program code configured to receive an input string of characters from the user input device;
computer readable program code configured to retrieve a bookmark list containing content identifiers that have been pre-stored by a user of the portable electronic device;
computer readable program code configured to compare the input string to the content identifiers in the bookmark list;
computer readable program code configured to display a selection list on the display including a subset of the content identifiers in the bookmark list that match the input string;
computer readable program code configured to generate, in response to the input string not being in any of the content identifiers in the bookmark list, a correlation metric indicative of how closely the input string matches each content identifier in the bookmark list; and
computer readable program code configured to display the content identifiers that most closely match the input string in the selection list.

* * * * *